(No Model.) 8 Sheets—Sheet 8.
P. H. STANDISH.
MACHINE FOR MAKING CHAINS.
No. 528,819. Patented Nov. 6, 1894.
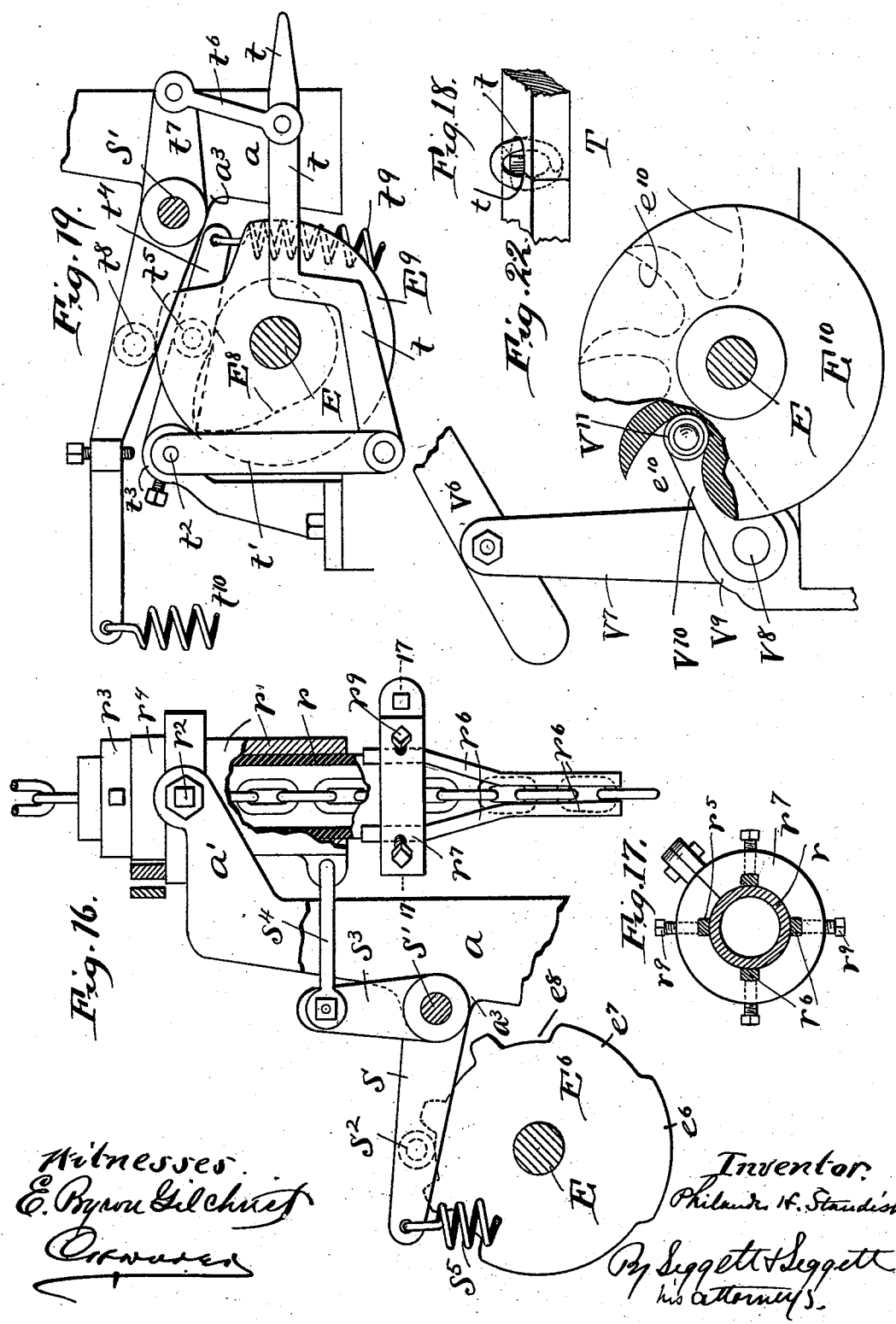

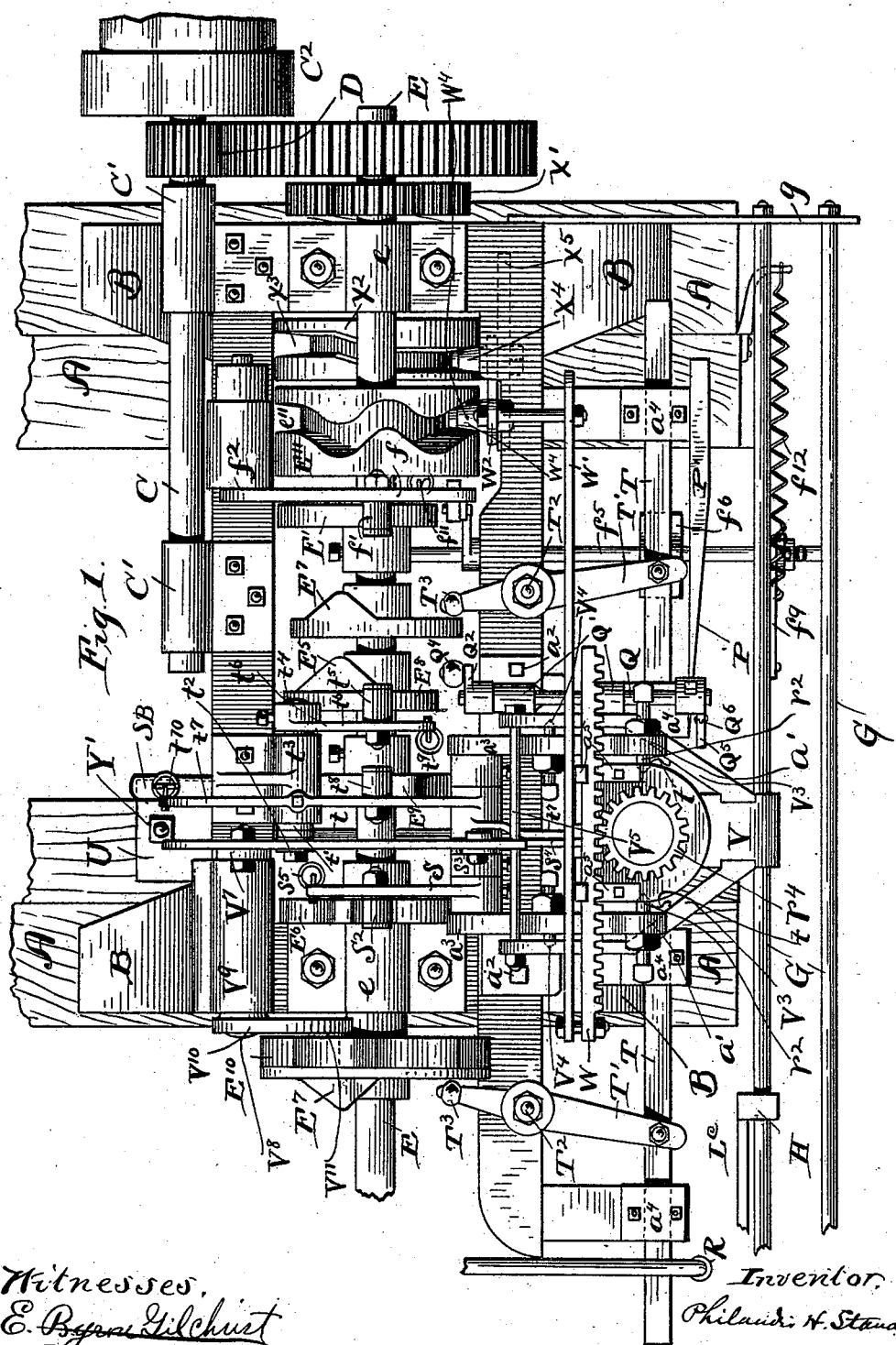

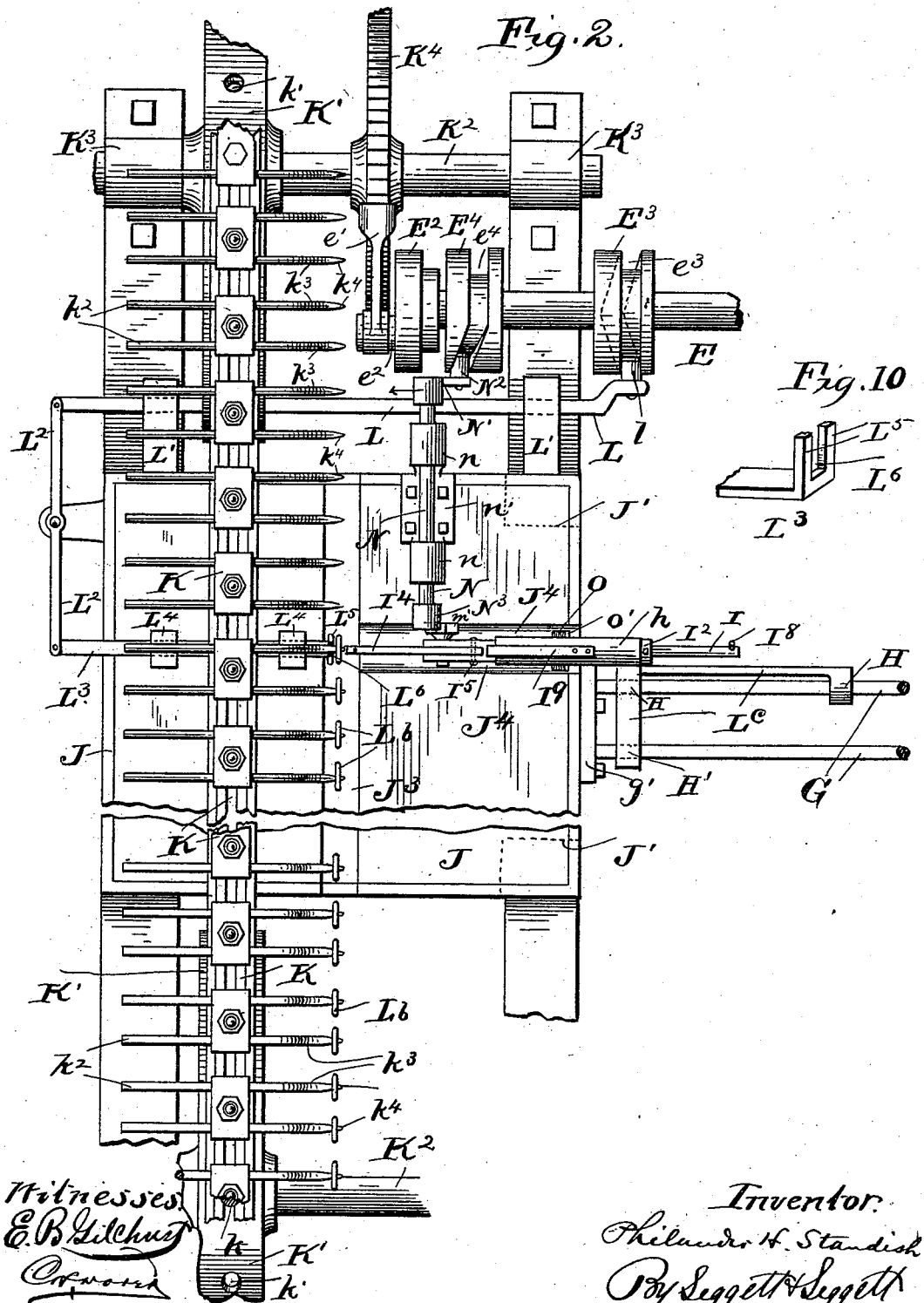

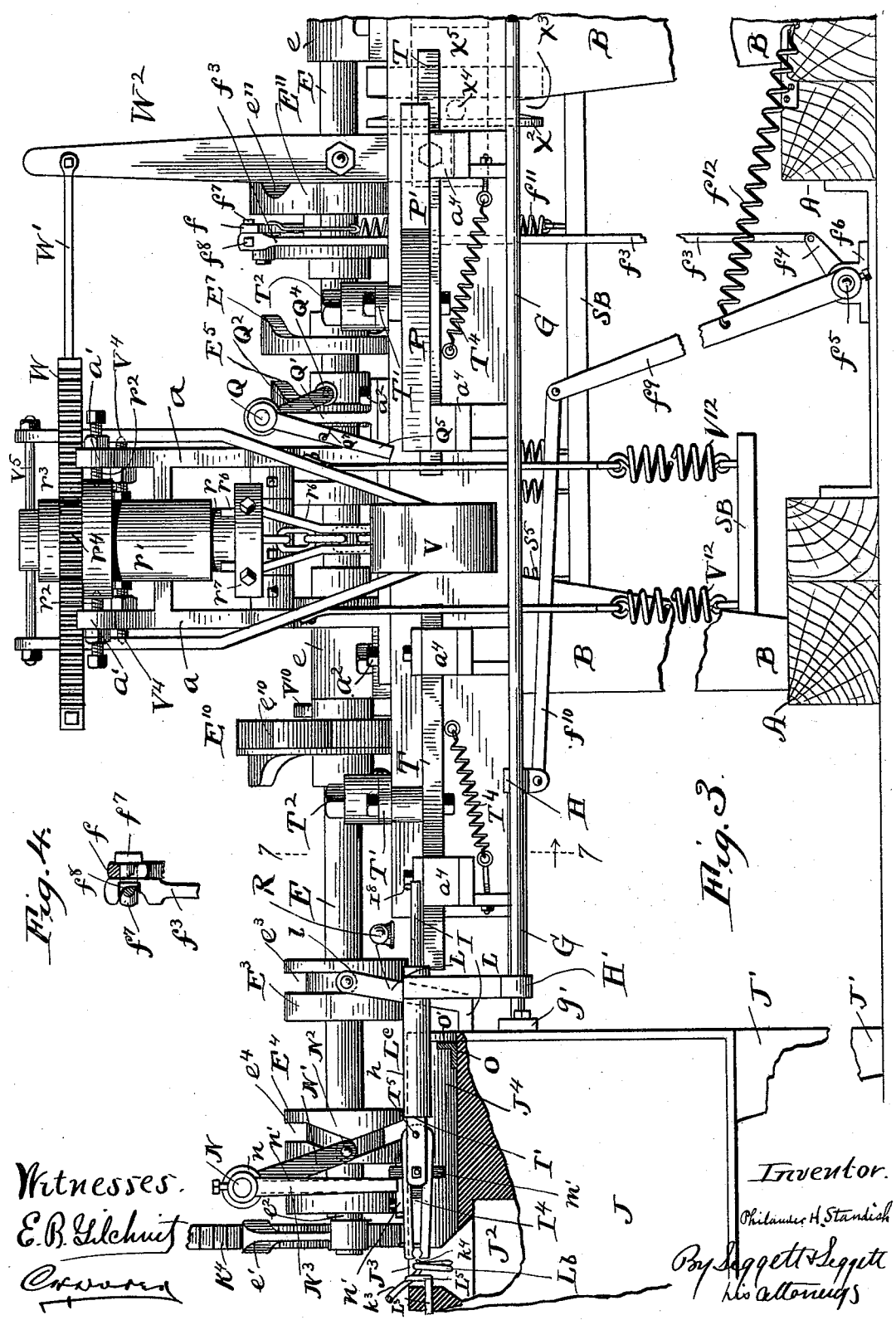

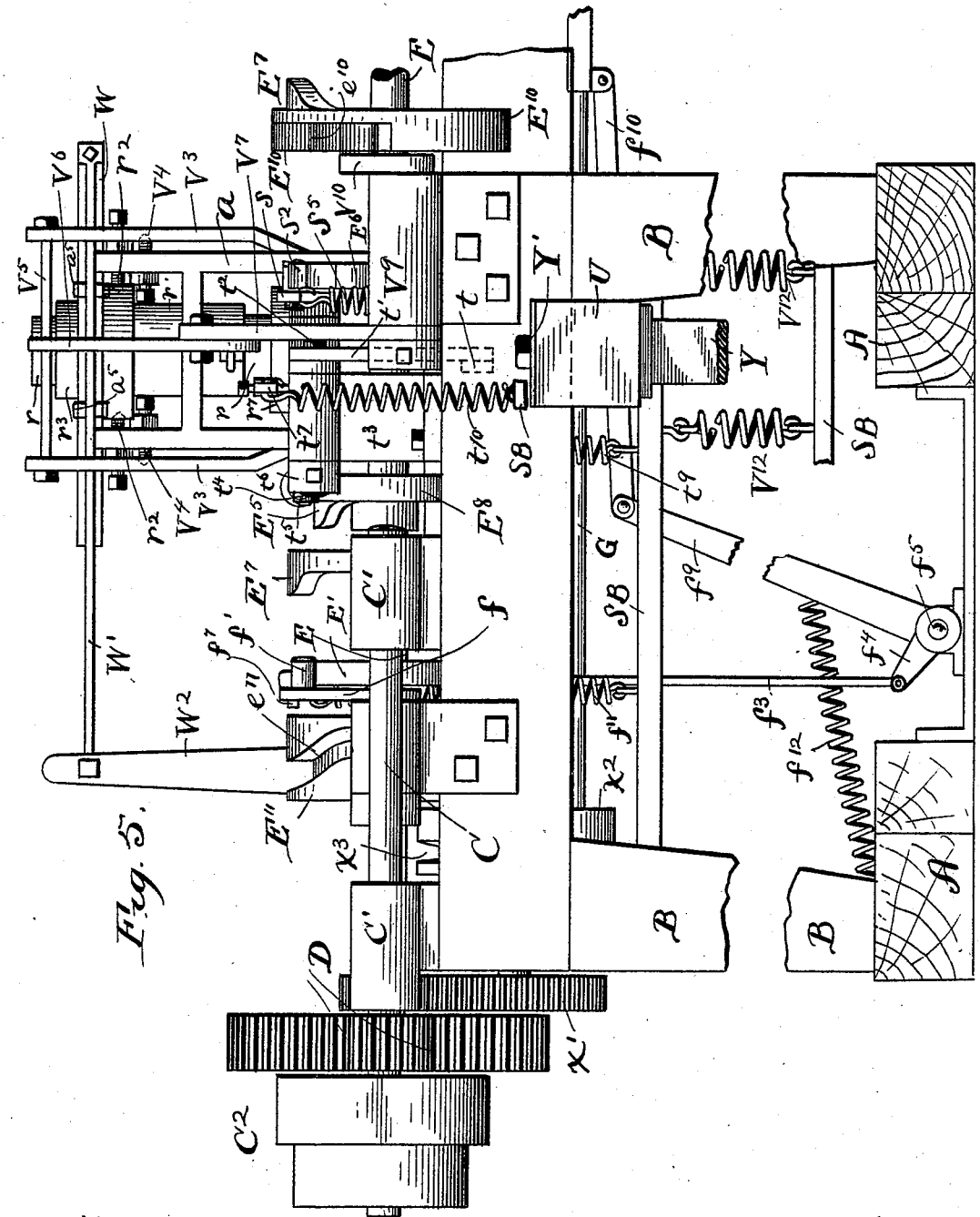

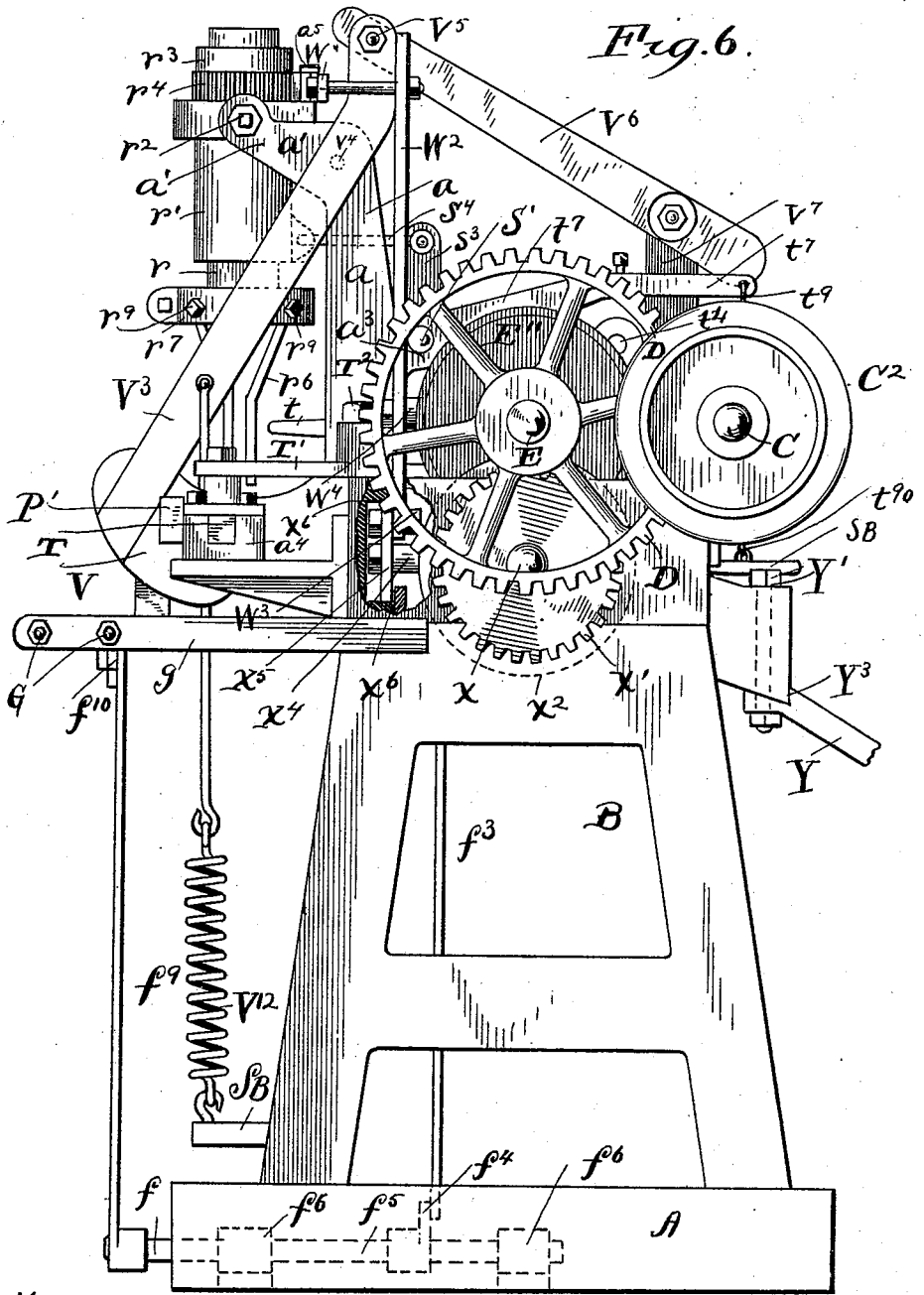

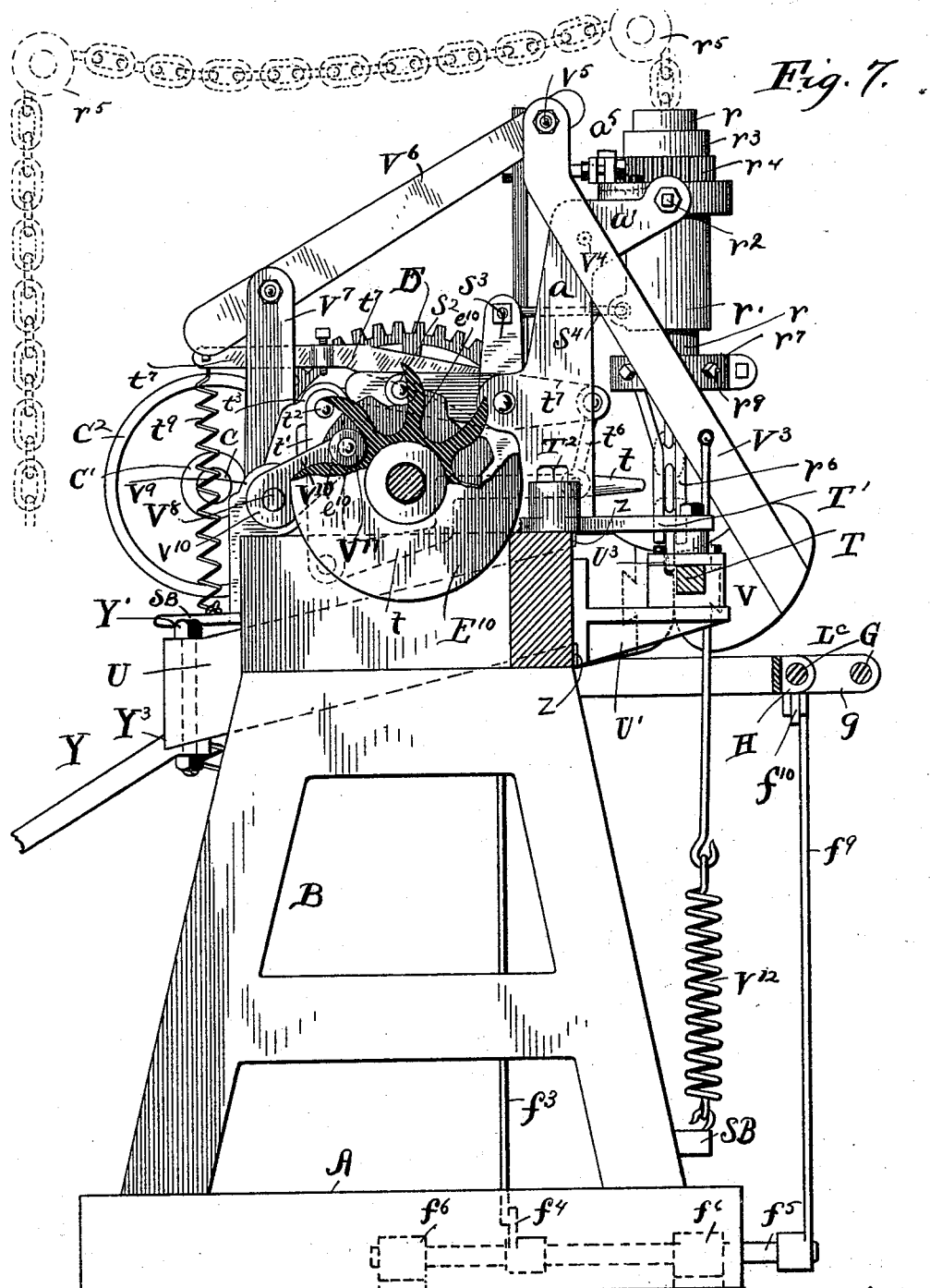

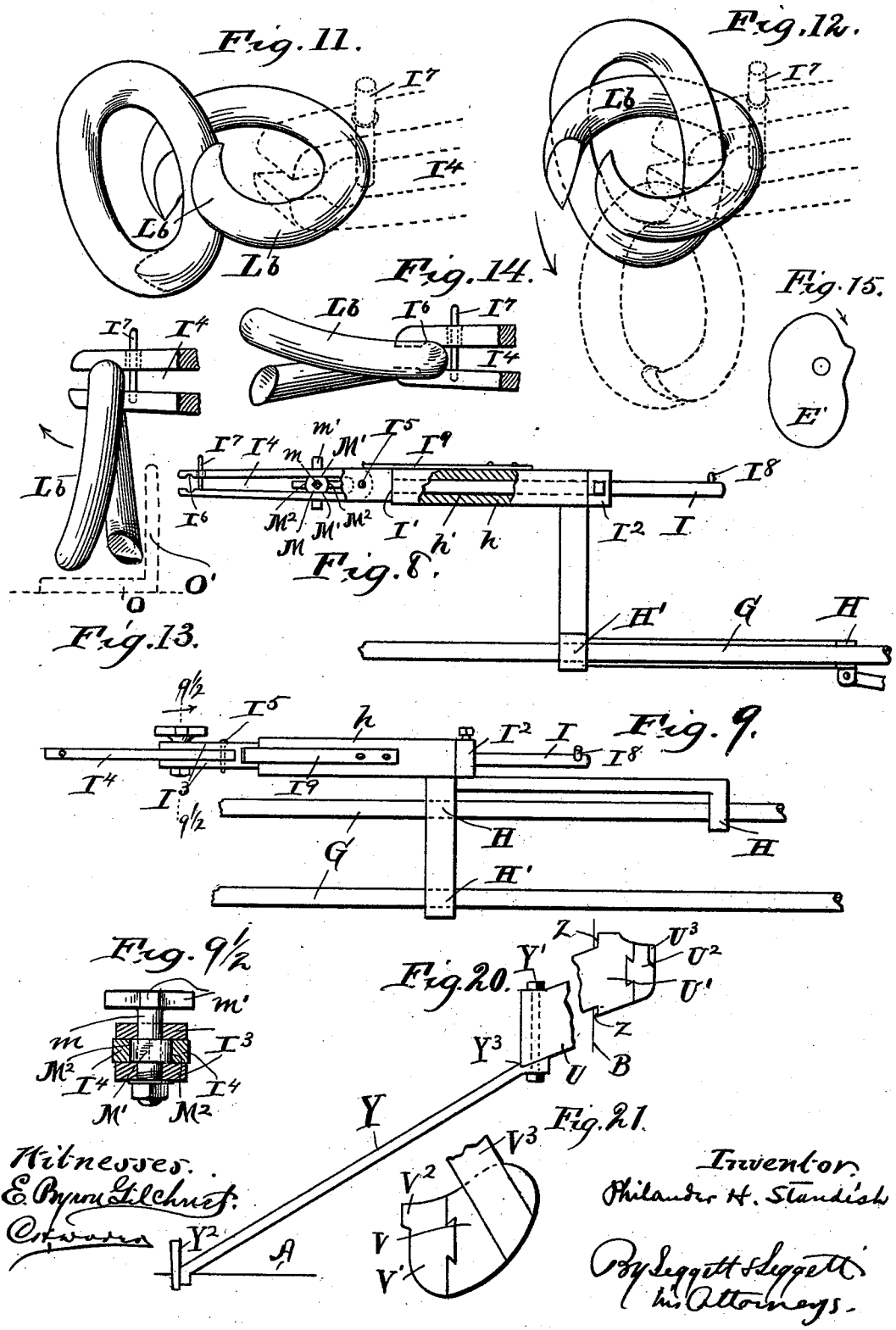

UNITED STATES PATENT OFFICE.

PHILANDER H. STANDISH, OF ST. MARY'S, OHIO.

MACHINE FOR MAKING CHAINS.

SPECIFICATION forming part of Letters Patent No. 528,819, dated November 6, 1894.

Application filed September 28, 1893. Serial No. 486,699. (No model.)

*To all whom it may concern:*

Be it known that I, PHILANDER H. STANDISH, of St. Mary's, in the county of Auglaize and State of Ohio, have invented certain new and useful Improvements in Machines for Making Chains; and I do hereby declare the following to be a full, clear, and exact description of the invention, such as will enable others skilled in the art to which it pertains to make and use the same.

My invention relates to improvements in chain-making-machines, more especially designed for making welded chain; and it consists in certain features of construction, and in combinations of parts hereinafter described and pointed out in the claims.

In the accompanying drawings, Figure 1 is a top plan of the main portion of a machine. Fig. 2 is a top plan of so much of the machine as is not exhibited in Fig. 1. Fig. 3 is a front side elevation of the machine. Portions are broken away in said figures to reduce the size of the drawings, and portions are also broken away and in section in Figs. 2 and 3 to more clearly show the construction. Fig. 4 is an elevation in detail, partly in section. Fig. 5 is a rear side elevation of a portion of the machine, with portions broken away to reduce the size of the drawing, and to more clearly show the construction. Fig. 6 is a right hand end elevation, partly in section. Fig. 7 is a left-hand end elevation, partly in section. Fig. 8 is a top plan of the link-carriage, partly in section, and Fig. 9 is a front side elevation of the same. Fig. $9\frac{1}{2}$ is an elevation, partly in section, on line $9\frac{1}{2}$—$9\frac{1}{2}$, Fig. 9. Fig. 10, on the same sheet with Fig. 2, is a perspective in detail. Figs. 11 and 12 show the manner of connecting the link-blank with the link last added to the chain. Fig. 13 shows the link held by the tongs of the link-carriage before the link is actuated into a horizontal plane, and Fig. 14 shows the link-holding-tongs holding a link-blank after the latter has been actuated into a horizontal plane. Fig. 15 is an elevation of cam E'. Fig. 16 is an elevation, partly in section, of the chain-holding-device and the mechanism employed for swinging said device laterally as will hereinafter fully appear. Fig. 17 is a plan in section on line 17—17, Fig. 16. Fig. 18 is a perspective in detail, and Fig. 19 is an elevation of the mechanism employed for lifting the chain in the chain-holding-device. Fig. 20 is an elevation of the anvil, U, and brace or bar, Y, a portion of the anvil being broken away to reduce the size of the figure. Fig. 21 is an elevation of a portion of the hammer employed to co-operate with the anvil. Fig. 22, on the same sheet with Figs. 16 to 19, inclusive, is an elevation, partly in section, of a portion of the mechanism employed for actuating the hammer.

A (Fig. 3) represents the timbers or foundation to which the supporting-frame, B, of my improved machine is secured.

C (see Fig. 1) represents the driving-shaft that is arranged lengthwise of the machine and has bearing in suitable boxes, C', rigid with the supporting-frame. Said shaft, at one end,—in the present instance the right hand end of the machine,—is provided with the driving-pulley, $C^2$, and is suitably intergeared, as at D, with a cam-shaft, E, that extends lengthwise of the machine parallel with the driving-shaft and has suitable bearing in boxes, $e$, rigid with the supporting-frame.

Upon shaft E, in the present instance near the central portion of the same, is operatively mounted a cam, E', that is adapted to engage a roller, $f'$, of a lever, $f$, that is fulcrumed, as at $f^2$, to the rear portion of the top of the supporting frame. Lever $f$ extends forwardly, and, at its forward or free end, is operatively connected, by means of a rod or link, $f^3$, with an arm or lever $f^4$, operatively mounted on a shaft $f^5$, that extends transversely of the machine and has bearing in suitable boxes, $f^6$, rigid with the foundation timbers of the supporting-frame below. The connection of lever $f$ with connecting rod or link $f^3$ is preferably by means of a stud, pin or bolt $f^7$, loosely embraced by the free end of said lever, in conjunction with a pin or bolt $f^8$ that pivotally secures the upper end of said link to stud or pivot $f^7$. (See Fig. 4.) The connection of link $f^3$ with lever, $f$, therefore, constitutes a sort of universal joint.

Shaft $f^5$, at its forward end, is provided with a lever, $f^9$, that, at its upper end, is operatively connected, by means of a connecting rod, $f^{10}$, with the chain-link-blank carriage, $L^c$, that is adapted to reciprocate lengthwise of the machine, being mounted upon a suitable track G G provided for the purpose, (see Figs. 1, 2 and 3) said carriage being adapted to convey the open-ended heated link from the heating furnace to and insert the same into the last link added to the chain being made, leaving the newly added unwelded link in position in the last welded link of the chain and to be operated upon by squeezing-bars to bring the free ends of the heated link together for the subsequent welding operation, all as will hereinafter fully appear. The cam-actuated mechanism hereinbefore described, operatively connected with the link-carriage, is adapted to actuate said carriage in the direction toward the heating furnace, in which the open-ended link-blanks are heated, for receiving a heated link from said furnace, and other means or mechanism are preferably provided for actuating said carriage in the direction away from the heating furnace.

The means just referred to, for actuating the link carriage in the direction away from the heating furnace, comprises preferably one or more springs acting opposite to the direction in which said carriage-actuating mechanism is actuated by the aforesaid cam E'. I prefer two springs for the purpose, one $f^{11}$ (see Fig. 3) attached at its upper end to lever $f$ and at its lower or opposite end to a springbar, S B, below, and another spring $f^{12}$ attached at one end to lever $f^9$ and at its other end to any rigid support, such for instance as one of the foundation timbers of the supporting frame of the machine.

Track G G comprises preferably a pair of rods or bars arranged parallel with each other and in the same horizontal plane, being rigidly supported in any suitable manner, preferably by one or more brackets or arms $g$ Fig. 1 projecting forwardly of and rigid with the supporting-frame and being also preferably rigidly secured, as at $g$, (Figs. 2 and 3) to the casing of the heating furnace wherein the chain-link blanks are heated.

The construction of the link-carriage is preferably as shown in Figs. 7, 8, and 9, wherein the same comprises three sleeves H, H, and H', rigid with one another, sleeves, H, H, nicely but easily embracing the inner rod or bar of the link-carriage track and sleeve H' nicely but easily embracing the outer rod or bar of the track, and the link-carriage also comprises a sleeve $h$ that extends lengthwise of the carriage and has a cylindrical bore $h'$ wherein is rotatably supported the correspondingly shaped shank I of the link-holding tongs, said shank being held from moving endwise of the supporting sleeve or bearing by means of a shoulder I' formed on the shank at the forward or outer end of the supporting-sleeve, and a collar, $I^2$, rigidly mounted on the shank at the inner or rear end of the supporting-sleeve or bearing. Shank I, forward of the supporting-sleeve, is preferably square in cross-section, and at its forward end is bifurcated or forked, as at $I^3$, for the reception of a pair of jaws $I^4$ of the tongs that are adapted to receive and hold the same into the link last added to the chain, said jaws being preferably spring jaws and arranged in the same vertical plane, and said jaws are preferably composed of a single piece secured, at the rear or inner end, to the shank of the tongs by means of a pin or bolt, $I^5$. Jaws $I^4$, on their opposing faces near their forward extremities, are recessed or grooved transversely, as at $I^6$, Fig. 9, said recesses being located directly opposite each other and adapted to receive the closed or upper end of the open-ended heated chain-link upon the delivery of the link, from the heating furnace to said jaws, the link hanging from the recess or groove of the lower jaw of the tongs when the tongs-jaws are open and being firmly held within the recesses of both jaws when the latter are closed, the heated link being delivered to the tongs sidewise with its open end lowermost and the jaws of the tongs of course being open when receiving the link. To prevent the link from being shoved or displaced rearwardly of or by the recesses or grooves in the jaws, a stop, $I^7$, is provided just rearward of said grooves or recesses, said stop comprising preferably a pin rigidly secured to the one jaw and extending far enough into or through the other jaw to prevent the displacement of the free end of said pin from the respective jaw when the jaws are opened. (See Fig. 8.)

Referring now to the heating furnace in the heating-chamber of which the open-ended link-blanks are heated and from which the heated link is, by the mechanism hereinafter described, delivered to the jaws of the tongs of the link-carriages, J (see Figs. 2 and 3) represents the casing of the same, said casing being mounted preferably upon legs, J', and $J^2$ represents the combustion and heating-chamber that is located, preferably centrally of and extends lengthwise of the furnace. Said combustion and heating-chamber is open at the top, as at $J^3$, and at one side of said opening, preferably about midway between said opening and the one side of the furnace, namely that side of the furnace opposite to the path of the aforesaid link-carriage, is located an endless traveling belt or conveyer, K, that passes over and under the furnace over wheels K' at the ends of the furnace. Said endless traveling belt or conveyer comprises preferably an endless metallic chain each link whereof has an inwardly-projecting sprocket or projection, $k$ that is adapted to engage corresponding holes $k'$, in the peripheries of wheels K'. Wheels K' are operatively mounted on shafts $K^2$, that are journaled in suitable boxes, $K^3$, supported by brackets secured to the adjacent end of the furnace-casing.

$k^2$ represents the holders or carriers from which the articles to be heated are suspended.

Said holders or carriers are secured, preferably removably, to the endless traveling belt or conveyer in any suitable manner, but equidistant apart.

Holders or carriers $k^2$, at the inner side of the endless conveyer, are bent toward the heating-chamber of the furnace, as at $k^3$, and said bent members of the holders, at their free ends, terminate in hooks, $k^4$, upon which the chain-link blanks $L^6$ are hung, the parts being so arranged that in operation the chain-link-blanks to be heated shall be carried into or through the heating-chamber of the furnace. The one shaft $K^2$ is provided with a ratchet-wheel $K^4$, (see Fig. 2) that is adapted to be engaged and actuated by a pawl, $e'$, suitably secured to the pin $e^3$, of a crank-wheel or crank, $E^2$ operatively mounted on cam-shaft E. The arrangement of parts is such that once in a rotation of crank-wheel or crank $E^2$, pawl $e'$ will actuate ratchet-wheel, $K^4$, to propel endless conveyer K the distance required to bring a heated blank in proper position for delivery to tongs-jaws $I^4$.

The mechanism for effecting the delivery of the heated link-blanks, from holders or carriers $k^2$, to tongs-jaws $I^4$, is also actuated by means operatively connected with cam-shaft E and is preferably as follows:

$E^3$ represents a cam-wheel operatively mounted on cam-shaft E. Cam-wheel $E^3$ is provided with a peripheral groove $e^3$, engaged by a roller, $l$ secured to reciprocating bar L that extends transversely of the heating-furnace below conveyer K and has bearing, at opposite ends, in suitable boxes or sleeves, $L'$, rigid with the furnace-casing. Reciprocating bar L, at its outer end, is operatively connected, by means of a lever $L^2$, with a reciprocating rod or bar, $L^3$, that extends parallel with bar L and has bearing in boxes or sleeves $L^4$, rigid with the furnace-casing. Reciprocating rod or bar $L^3$, also extends in under conveyer K and at its free end, terminates in an upright member, $L^5$, slotted, as at, $L^6$, (see also Fig. 10) to straddle blank-holders or carriers $k^2$ and adapted to engage the adjacent side of the heated link and shove or force the same off the respective holder or carrier $k^2$ onto the lower jaw of the tongs of link-carriage $L^c$, the arrangement of parts being such that cam-wheel $E^3$ will actuate said mechanism to cause the latter to engage the heated links on the holders or carriers $k^2$ at the proper time to cause them to be delivered to said tongs, and the parts are preferably so timed that just as a holder or carrier $k^2$ shall have brought a link into position for delivery to the tongs of link-carriage $L^c$, the means for effecting said delivery shall have been actuated simultaneously to perform its function and the link-carriage shall have been simultaneously brought into position to receive the link.

The top of the furnace-casing is recessed or offset downwardly, as at $J^4$, to accommodate the location and operation of the tongs of the link-carriage.

As already indicated, the tongs of the link-carriage, when receiving a link from the heating furnace, is open, and the link hangs from the lower jaw of the tongs with the open end thereof presenting downwardly. Suitable means are provided for holding the tongs open preparatory to the reception of the link. The means employed comprises preferably a cam or eccentric, M, (see Fig. 8) interposed between jaws $I^4$, rearward of stop $I^7$ and integral with or operatively mounted upon a turntable pin or bolt, $m$, that has bearing in the members of the forked end of the shank of the tongs, pin or bolt $m$ being provided at one end with a cross-shaped head, or star-wheel, $m'$, adapted to be actuated, by mechanism operatively connected with cam-shaft E, to cause cam or eccentric M to be actuated to close the jaws of the tongs. Cam or eccentric M is preferably of the form or construction shown in Fig. 8, wherein the same has flat portions, $M'$, diametrically opposite its axis, and is convex, as at $M^2$, between the flat surfaces, the convex portion of course having the greatest diameter and hence by turning said cam or eccentric into the position shown in solid lines in Fig. 8 to bring the flat sides thereof in engagement with the jaws of the tongs, the latter, by means of a spring acting in the direction to close the jaws (preferably by virtue of the spring in the metal of which the jaws are composed) are closed, and by turning said cam or eccentric so as to bring the convex sides or that portion of the same having the greatest diameter in engagement with the tongs-jaws, the latter will be opened.

The open ended link to be inserted into the welded link last added to the chain of course has to be brought into the proper position for insertion into the link last added to the chain, preparatory to such insertion, and the link last added to the chain should be properly held for receiving the open-ended unwelded link.

In Figs. 11 and 12 is shown the position that the link last added to the chain assumes preparatory to the reception of the new link, and it will be observed that the link last added to the chain, as shown in said figure, lies in a plane oblique to a vertical plane with the sides of the link presenting in the path of the link to be next added and welded. The means employed for actuating the chain to bring the last link added to the chain into the position shown in Figs. 11 and 12 will be hereinafter described. Suffice it here to remark that said means is actuated at the proper time to bring said link into the position indicated at the proper time to receive the new link. It follows, therefore, that in order to bring the open ended link into the proper position shown, relative to the position of the link last added to the chain, and shown in Figs. 11 and 12, from the hanging position it occupies when received by the open jaws of the tongs of the link-carriage, the open ended link must first be actuated to assume a horizontal position with the open end thereof presenting outwardly and then must be given a partial turn laterally, and it also follows that suitable means must be provided for closing the jaws of the tongs preparatory to actuating the link into a horizontal position so that when the link assumes such horizontal position it will retain said position until thereupon turned laterally and that suitable means should be provided whereby the open-ended link shall be held in such laterally-turned position until the same has properly been inserted in the link last added to the chain.

Suitable means for actuating cross or star-wheel $m'$, to thereby actuate cam or eccentric M to close the jaws of the tongs of the link-carriage, is shown in Figs. 2 and 3 wherein N represents an oscillating shaft that is arranged transversely of the machine and has bearing in suitable boxes $n$ supported, for instance by a standard, $n'$, rigidly secured to the casing of the heating furnace. Shaft N, is provided with a lever, $N'$, that has a roller $N^2$ engaging cam-groove $e^4$ of a cam-wheel $E^4$ operatively mounted on cam-shaft E. At its forward end, shaft N is provided with a lever, $N^3$.

The trend of groove $e^4$ of cam-wheel $E^4$ is such that lever $N'$, shaft N and lever $N^3$ are actuated in the direction of the arrow, (see Fig. 2) and the arrangement of parts is such that when link-carriage $L^c$ is in position receiving a link, lever $N^3$ will engage the left hand side of the upwardly-projecting wing or member of the cross-shaped or star-wheel $m'$ so that when said lever is actuated in the direction indicated wheel $m'$ will thereby be actuated to give cam or eccentric M a quarter turn to permit the jaws of the tongs of the link-carriage to close, the trend of the groove of the cam-wheel and the length of lever $N^3$ being such as to cause the free end of said lever to be moved a distance sufficient to permit the cross-shaped or star wheel $m'$ to pass thereunder, after being turned, in the reciprocation of the link-carriage from and to the heating furnace. The jaws of the tongs of the link-carriage having closed upon the link the latter is firmly held, and it follows that when the link is thereupon actuated to assume a horizontal position with its open end presenting outwardly, the link will be held in such horizontal position.

The means employed for actuating the link to assume the horizontal position indicated, comprises preferably an angle-plate or iron, O, the upright member $O'$ whereof is adapted to be engaged by the link hanging from the tongs of the link-carriage when said carriage is reciprocated in the direction away from the heating furnace. (See Figs. 2, 3 and 13.) Angle-plate O is secured preferably to the top of the furnace casing, at the outer end of the downward offset $J^4$ in the top of said casing, and, when engaged by the link, causes the free or open end of the latter to be lifted or swung outwardly into a horizontal or approximately a horizontal plane with the end of the link held between the jaws of the tongs of the link-carriage, as shown in Fig. 14.

The shank of the tongs of the link-carriage, at or near its rear or outer end, is provided with a laterally-projecting lug or member, $I^8$, that is adapted to engage a stationary cam or incline P rigid with the supporting-frame of the machine. (See Figs. 1 and 3.) The link-carriage is adapted to travel, in the direction away from the heating furnace, beyond the point at which the open ended link is connected with the chain. The trend of cam or incline P is such that when said cam or incline is engaged by lug or member $I^8$ of the shank of the link-holding tongs during the reciprocation of the link-carriage away from the heating furnace, the link-holding tongs and consequently the link held thereby, will be given a partial turn laterally to bring the open end of the link into proper position for the insertion of said link into the link last added to the chain, the trend of said cam or incline in the present instance being forwardly in the direction away from the heating furnace and hence the link-holding tongs is given a partial turn forwardly, thereby causing the link to assume the position shown in Figs. 11 and 12 in which position the open end of the link can with facility be inserted into the link last added to the chain as illustrated in said figures, the means for holding the chain, that will hereinafter be described, being of course swung outwardly or forwardly into the path of the link-carriage to bring the link last added to the chain into proper position for the reception of the new link. The location of cam or incline P, relative to the point at which the link is connected with the chain, is such that link-holding tongs and the link held thereby shall have been given the proper turn laterally when the link, during the reciprocation of the link-carriage away from the heating furnace, shall have reached the point at which the open ended link is inserted into the link last added to the chain and said cam or incline is preferably formed upon a stationary plate, $P'$, the front surface whereof extends straight outwardly from the forward extremity of the cam or incline parallel with the path of the link-carriage so that when the link-carriage has traveled beyond or past the point at which the open ended link is connected with the chain to permit the chain-holding means to be swung outwardly or forwardly to bring the link last added to the chain in position for the reception of the new or open link, the link holding-tongs and link held thereby shall be retained in the laterally-turned position until after the new open link has been properly inserted in the link last added to the chain.

Suitable means are provided for actuating cross-shaped or star-wheel $m'$ to turn cam or eccentric M in the direction to open the jaws of the tongs of the link-carriage immediately upon the proper insertion of the open-ended link into the link last added to the chain. Preferable means for this purpose is shown in Figs. 1 and 3 wherein Q represents an oscillating shaft that is arranged transversely of the machine at a suitable elevation and is supported by a standard Q' rigid with the supporting-frame. Said oscillating shaft at its rear end is provided with a downwardly-extending arm or lever, $Q^2$, that at its free extremity is provided with a roller, $Q^4$, adapted to be engaged by a cam, $E^5$, operatively mounted on cam-shaft E. At its opposite or forward end shaft Q is provided with an arm or lever, $Q^5$, that is adapted to engage the forward side of the upwardly-projecting wing or member of cross-shaped or star-wheel $m'$ and actuate said wheel to turn cam or eccentric M to open the jaws of the link-holding tongs. About midway of its length lever, $Q^5$, is jointed, as at $Q^6$, in such a manner that the lower member of said lever is free to move independently of the other or upper member of said lever in the direction toward the heating furnace but is prevented from independent movement in the opposite direction by a suitable stop, $Q^7$, (see Fig. 3) formed or provided at the joint of the lever. The parts are so arranged and timed that when the open-ended link has been properly inserted into the link last added to the chain cam $E^5$ shall have come into position to actuate lever $Q^2$ and thereupon actuate shaft Q and lever $Q^5$ to cause the latter to give cross-shaped or star-wheel $m'$ a quarter turn and thereby actuate cam or eccentric M to open the jaws of the link-holding tongs, permitting the free or open end of the open link to drop or fall by gravity as shown in dotted lines Fig. 12.

As hereinbefore indicated, the reciprocation of the link-carriage away from the heating furnace is effected by means of springs $f^{11} f^{12}$, and the reciprocation of said carriage in the opposite direction is effected by means of the lever-mechanism operatively connected with said carriage and actuated by cam E'. The construction of said cam E' is such, however, that said cam will remain idle for a short time after the connection of the link with the chain to permit springs $f^{11} f^{12}$ to cause the link-carriage to recede and thereby entirely release the link from the link-holding tongs, if such release has not already been effected, leaving the link hanging from the last welded link of the chain.

The parts are of course so arranged and timed that the jaws of the link-holding tongs shall be opened immediately after the proper insertion of the open link into the link last added to the chain, whereupon the link-carriage, by means of springs $f^{11} f^{12}$ and the peculiar construction of cam E' permitting the action of said springs, shall be actuated to release the link or cause the latter to be disengaged from the link-holding tongs, whereupon the means for holding the chain with which the open link has just been connected, is, by means hereinafter described, swung back to its normal position out of the way of the path of the link-carriage, permitting the latter to return to the heating-furnace for another link, cam E' being of such construction as already indicated, as to effect the return of said carriage to the heating furnace. The construction of cam E' is clearly shown in Fig. 15.

Suitable means, preferably a perforated pipe R, as shown in Figs. 1 and 3, is provided for conducting and discharging water upon the link-holding tongs preparatory to its return to the heating furnace for another link, said pipe being located preferably at a suitable elevation between the point at which the links are added to the chain and the heating-furnace, suitable means not shown being provided for causing the discharge of water at the point indicated to be intermittent, that is, for causing the pipe to discharge water upon the tongs only at the time of its return to the heating furnace for another link.

I would here remark that the partial turn of the link-holding tongs by cam or incline P, is against the action of a spring, $I^9$, secured, for instance, to supporting-sleeve or bearing $h$ and, at its free end, bearing against the one side of the square portion of the shank of the link-holding tongs. Hence, as lug or member $I^8$ rides adown cam or incline P in the reciprocation of the link-carriage toward the heating furnace, the tongs, by the action of said spring, will be returned to its normal position.

Referring next to the means employed for holding the chain during the insertion of an open link into the link last added to the chain, and for holding the open-ended link after its connection with the chain for the subsequent squeezing and welding operations hereinafter described, and for guiding and conveying the chain from the machine, $r$ (see Figs. 3, 6, 7, 16 and 17) represents an upright hollow turnable barrel or cylinder that extends upwardly through a sleeve $r'$ that, at its upper end, is pivotally hung, as at $r^2$, from and between forwardly projecting arms $a'$ of upright housings $a$, that are bolted, as at $a^2$, to the supporting-frame of the machine, barrel or cylinder $r$ being supported within sleeve $r'$ by means of a collar, $r^3$, rigidly mounted in any suitable manner upon the upper end of said barrel or cylinder, said collar at its lower end being provided with a pinion $r^4$ for a purpose hereinafter made apparent, said pinion being rigid or integral with said collar and resting upon the top of sleeve $r'$. It will thus be observed that barrel or cylinder $r$ is adequately supported and at the same time is free to turn within the supporting sleeve $r'$. The bore of barrel or cylinder $r$ is just large enough to freely accommodate the passage of the finished chain up through the same, whence the chain passes to and over sheaves $r^5$ (Fig. 7) that are secured to any suitable support overhead and thence the chain passes downwardly to the floor of the shop where it accumulates as rapidly as manufactured.

Barrel or cylinder $r$ is located at the rear of the path of the link-carriage, and, at its lower end, is provided with suitable means for holding the chain, said chain-holding means comprising preferably four spring-bars or jaws $r^6$ arranged in the form of a square in cross section or bottom plan, as shown in Fig. 17. Chain-holding bars or jaws $r^6$ are located a suitable interval apart to receive and accommodate the passage of the chain up through barrel or cylinder $r$, said bars or jaws being adapted, by virtue of their spring, to take a positive hold of the chain. The construction and arrangement of holding-bars or jaws of the chain-holding-device is preferably such that the chain-holding device is adapted to take hold of but one or two links of the chain at a time, for instance, the link of the chain last welded from which link, as already indicated, hangs the open-ended link that has last been connected with the chain ready for the squeezing operation, that is, ready for the operation that shall bring or lap the free ends of the link together in position for the subsequent welding operation. Preparatory to the welding operation, however, the chain, by means hereinafter described, is lifted the length of a link to thereby bring the link whose ends have just been lapped together, within the clutching portion of the chain-holding device, thereby causing said link to be firmly held during the subsequent welding operation.

By means of the feature just described whereby the link-holding device is adapted to clutch but one or two links of the chain, it follows that the elevation of the chain, by means already alluded to and hereinafter described, is facilitated, and said feature is attained by the construction shown in the figures already referred to, wherein the clutching-bars or jaws $r^6$ of the chain-holding device, from the point at which they are adapted to clutch the chain, diverge outwardly and upwardly.

Bars or jaws $r^6$ are preferably secured to barrel or cylinder $r^4$ by means of a clamp, $r^7$, that is recessed at its inner periphery as at $r^8$ for the reception of said jaws or bars, and, in open relation with said recesses, is provided with lateral screw-threaded perforations for the reception of screws $r^9$ that screw into correspondingly threaded holes in the jaws of the link-holding device, thereby securing said jaws or bars to the clamp.

Barrel or cylinder $r$ being located at the rear of the path of the link-carriage, as already indicated, it follows that said barrel or cylinder and attached chain-holding device must be swung outwardly or forwardly at the proper time for bringing the last welded link of the chain in position for the reception of the link carried by the link-carriage. Preferable mechanism for thus swinging barrel or cylinder $r$ outwardly is shown in Figs. 1 and 16, and is adapted to be actuated by a cam, $E^6$, operatively mounted on cam-shaft E. The mechanism shown comprises an arm or lever, S, operatively mounted upon a short shaft S' that is arranged parallel with the cam-shaft between the latter and barrel or cylinder $r$ and has bearing in rearwardly projecting lugs or ears $a^3$ or housings $a$. Lever S is provided with a roller, $S^2$, engaged by cam $E^6$. Shaft S', adjacent to arm or lever S, has operatively mounted thereon an upwardly-extending arm or lever, $S^3$, to which barrel or cylinder $r$ is operatively connected by means of a link, $S^4$. Portion $e^6$ of cam $E^6$ is adapted to actuate the mechanism just described to swing barrel or cylinder $r$ outwardly into the path of the link-carriage, and $S^5$ represents a spring that is attached at opposite ends, to lever S and a spring-bar $S^b$ (Fig. 7), respectively, and acts in the direction to actuate said mechanism to swing barrel or cylinder $r$ rearwardly or inwardly out of the way of the path of the link-carriage.

The open-ended link is clearly shown in Figs. 11 to 14 inclusive, upon reference to which drawings it will be observed that the free ends of the link are separated a suitable distance so that the link is easily inserted into the last welded link of the chain as hereinbefore described, and the free ends of the link are cut diagonally in such a manner that when said ends are brought together by the squeezing-bars, that will presently be described, said ends will lap the one over the other, whereupon said ends of the link are ready to be welded together.

T (see Figs. 1, 3 and 7) represents the bars,—squeezing-bars, as I term them,—for bringing the free ends of the link together as just described. Two of said bars are provided, one for each extremity of the open link, said bars being located, respectively, at opposite sides of the link and adapted to simultaneously act upon the link. The location of said squeezing-bars is preferably in a plane just forward of the point at which the links are welded and rearward of the path of the link-carriage and the bars, by mechanism that will presently be described, are adapted to be reciprocated endwise in suitable bearings $a^4$ that are rigid with the supporting frame of the machine. The squeezing-bars are recessed or grooved vertically on their faces to nicely fit and embrace the round surface of the link, said grooves or recesses being preferably of such size that said bars will close together as shown in Fig. 18, when the extremities of the link shall have been properly lapped together. The squeezing bars are actuated in the direction to lap the extremities of the link together by means of swinging levers, T', that are fulcrumed, as at $T^2$, to the supporting-frame, being operatively connected at their forward end, with the respective squeezing-bars in any suitable manner, and being actuated, to reciprocate the squeezing-bars to cause the latter to perform their function, by cams $E^7$ operatively mounted on cam-shaft E, levers T' being provided with rollers, $T^3$, at the point of engagement by the actuating-cams, and the squeezing-bars are separated or returned to their normal position by means of springs $T^4$ that are attached at opposite ends to the squeezing-bars and supporting-frame of the machine, respectively, as shown very clearly in Fig. 3. As already indicated, the squeezing-bars are located at the rear of the path of the link-carriage, and the parts are so arranged and timed that barrel or cylinder r and attached chain-holding device shall be swung inwardly or rearwardly into a position directly between the squeezing-bars immediately after the insertion of the open ended link into the link last added to the chain, whereupon the mechanism for actuating the squeezing-bars, to cause the latter to squeeze and properly lap the free extremities of the link together, performs its function. Barrel or cylinder r and attached chain-holding device is swung into the position between the squeezing-bars, as already indicated, by means of spring $S^5$, the inward or rearward movement of said barrel or cylinder being partially limited by portion $e^7$ of cam $E^6$, which portion being of less radius than portion $e^6$ of the cam permits spring $S^5$ to act to swing barrel or cylinder r and attachments inwardly during the passage of roller $S^2$ of lever S from portion $e^6$ to portion $e^7$ of cam $E^6$, the radius of portion $e^7$ of the cam being such that said barrel or cylinder shall be swung into position directly between the squeezing-bars as above indicated, portion $e^7$ of the cam being adapted to hold cylinder or barrel r and attached chain-holding device in position between the squeezing-bars until the latter have properly performed their function. The free extremities of the link having been lapped together, as just hereinbefore described, the link is in condition for the welding operation. The link, hanging loosely however, from the link last welded that is, not being rigidly held, it is not yet in proper position for the welding operation, but the link, whose extremities have just been lapped together, or rather the portion of the chain with which said link is connected, should be lifted or elevated to bring the upper end of the link to be welded within the chain-holding device, to be firmly held or clutched by bars or jaws $r^6$ of the chain-holding device. The mechanism employed for thus elevating the link to be welded consists preferably of a bar t (see Fig. 19) operatively connected with an arm or lever, t', of an oscillating-shaft $t^2$ that has bearing in box $t^3$ rigid with the supporting-frame, said shaft also having an arm or lever, $t^4$, that is provided with a roller $t^5$ engaged by cam $E^8$ operatively mounted on the driving-shaft. Near its forward end, bar t is operatively connected, by means of a link $t^6$, with a tilting lifting-lever, $t^7$, that is fulcrumed near its central portion being preferably loosely mounted upon shaft S'. Lever $t^7$ is provided with a roller, $t^8$, that is engaged by a cam $E^9$ operatively mounted on cam shaft E. The part are so arranged and timed that bar t is by means of the mechanism operatively connected with said bar and actuated by cam $E^8$, actuated forwardly or outwardly and inserted into the adjacent link of the chain and immediately upon the insertion of bar t into said link of the chain, cam $E^9$ will have assumed a position to actuate lifting lever $t^7$, resulting in the upward actuation of the forward or outer end of bar t to elevate or lift the link into which said bar has been inserted and thereby lift the link into position to be held within the chain-holding device. The arrangement of parts is preferably such that bar t shall be inserted into the third last link of the chain (inclusive of the link to be welded). At least the arrangement of parts should be such that no links of the chain, above the link into which the bar t is inserted, are rigidly held by the chain-holding-device, and the link into which the bar is inserted is preferably one that is not rigidly held by the chain-holding-device, the object being that when the link, into which lifting-bar t is inserted, and the links below said link, are elevated by means of said bar, the chain will be automatically fed from barrel or cylinder r by means of the gravity of that portion of the chain that leads downwardly to the floor of the shop at the rear of the machine, and I would here remark that a piece of chain previously made is used to furnish the weight when the machine is first put in operation.

The portion of the chain including the link to be welded, having been elevated as hereinbefore described, the mechanism for actuating bar t is returned to its normal position by means of springs $t^9$ and $t^{10}$, both of said springs at their lower end being attached to any suitable support, such as the spring-bars below, and at their upper end being attached to levers $t^4$ and $t^7$, respectively. Said springs not only return the lever-mechanism operatively connected with bar t and actuated by cams $E^8$ $E^9$, to its normal position, when the actuating-levers of said mechanism are released by said cams, but also prevent any loss of motion during the operation of the parts.

U (see Figs. 7 and 20) represents the anvil upon which the link is welded and V represents the hammer for performing the welding operation. The head U' of the anvil, upon its face, is provided with the female-die, $U^2$, that has a recess $U^3$ for receiving the end of the link to be welded. The location of said anvil is such, relative to the chain-holding-device, that when the latter is swung inwardly or rearwardly to a perpendicular position, after the link to be welded has been elevated, as hereinbefore described, the link to be welded will enter recess $U^3$ in the face of die $U^2$ in position to be operated upon by hammer V. Barrel or cylinder $r$ and attached chain-holding device is swung inwardly, to bring the link to be welded within the recess of the die of the anvil, by means of the depression $e^8$ in the periphery of cam $E^6$, said depression permitting spring $S'$ to actuate the mechanism operatively connected with the supporting-sleeve of said chain or barrel to swing the latter to the position indicated and thereby bring the link in position for the first blow of the hammer, and the parts are so arranged and timed that the chain-holding device shall be swung inwardly to bring the link to be welded in position for welding immediately upon the elevation of said link as hereinbefore described. Hammer V, upon its face, is provided with the male die, $V'$, that has a lug or projection $V^2$ adapted to engage the inner side of the lower end of the link, or that end that is to be welded, the shape of said projection or lug and the form and size of the recess in the die of the anvil being such that the welded end of the link shall be given the proper rounded form and finish during the welding operation.

The construction of hammer V and the mechanism employed for operating the same are clearly shown in Figs. 1, 3, 5, 6, 7, and 22 wherein $V^3$ represents the hammer-arms to and between the lower ends whereof the hammer proper is suitably secured, the hammer-arms extending upwardly and rearwardly at the outside of the respective housings $a$ to which the arms are pivotally secured, as at $V^4$. The hammer-arms extend a suitable distance above their pivotal bearings, and at their upper end are preferably braced and tied together by means of a cross-rod or cross-bar, $V^5$, that is operatively connected, by means of a link $V^6$, with an upwardly-extending arm or lever $V^7$ of an oscillating shaft $V^8$ that has suitable bearing in a box $V^9$ (see Fig. 22) rigid with the supporting-frame, said shaft having also an arm or lever, $V^{10}$, that, at its free or outer end, is provided with a roller, $V^{11}$, adapted to engage radial slots, recesses or pockets, $e^{10}$ of a cam, $E^{10}$, operatively mounted on cam-shaft E, that is adapted to actuate lever $V^{10}$ and the hammer operatively connected therewith to elevate or swing the hammer outwardly from the anvil. The construction of said cam, that is properly termed the hammer-cam, is very clearly shown in Figs. 7 and 22 and is such that the hammer shall be elevated or swung outwardly far enough to accommodate the operation of the link-carriage, squeezing-bars and swing-movements of the chain-holding device.

The hammer is actuated to deliver its blows partly by gravity, but more especially by means of springs $V^{12}$ connected at one end with the hammer-arms, and at their other end with a spring-bar $S^b$. The hammer is adapted to deliver as many blows as there are slots, or pockets $e^{10}$ in cam $E^{10}$, the hammer, by means of the hammer-cam illustrated, being adapted to deliver four consecutive blows, the hammer-cam being provided with four of said recesses or slots arranged at suitable intervals.

By the construction of hammer-cam shown, it will be observed that, in the operation of the machine, as roller $V^{11}$ of lever $V^{10}$ falls into said recesses or slots of the hammer-cam, lever $V^{10}$ and the mechanism operatively connecting it with the hammer, will be actuated to permit springs $V^{12}$ to co-operate with gravity in actuating the hammer to cause the latter to deliver a blow, said springs being strained or put under tension when the cam-actuated mechanism is operated to elevate the hammer.

The parts are so arranged and timed that the hammer shall be actuated to deliver its first blow immediately upon the reception, by the die of the anvil, of the link to be welded. It is manifest, however, that in order to properly weld the link, blows should be delivered, alternately, upon opposite sides of the link, and hence, suitable means or mechanism should be provided for giving the chain-holding device and link to be welded a half turn in the interval between successive blows of the hammer.

The mechanism employed for giving the chain-holding device and consequently the link being welded a half turn, as just indicated, is preferably as follows:—As hereinbefore described, cylinder or barrel $r$, that supports the chain-holding device, is rotatably supported, and is provided with a pinion $r^4$. Said pinion is in mesh with a rack, W, that is held from displacement from the pinion by means of the over-hanging lips or projections $a^5$ of housing $a$, and is operatively connected, by means of a link, $W'$, with an upright lever $W^2$ that is fulcrumed at its lower end, as at $W^3$, (see Fig. 6) and is provided with a roller $W^4$ (see also Fig. 1) adapted to be engaged by cam groove $e^{11}$ in the periphery of cam-wheel $E^{11}$ that is operatively mounted on cam-shaft E, the trend of said groove being such and the parts being so arranged and timed that said lever shall be actuated between successive blows of the hammer and reciprocate rack W the distance required to give pinion $r^4$ a half rotation and thereby give the chain-holding device and link to be welded the half turn required to bring the opposite side of the link being welded in position to receive the next succeeding blow of the hammer, the hammer-operating mechanism and chain-holding-device turning-mechanism being so timed, relative to each other, that the link being welded will be given a half turn in the interval of time between successive blows of the hammer. It will be observed, however, that when the last blow of the hammer has been delivered the link that has just been welded is not in proper position to receive the next incoming open-ended link, but that a quarter turn must be given to the welded link to bring the same into the position required for the reception of the next incoming open-ended heated link. The means preferably employed for giving the chain-holding-device, and consequently the last welded link, the quarter turn just indicated is as follows:

X (see Fig. 6) represents a shaft that is arranged parallel with cam-shaft E a suitable distance below the latter and supported by the supporting-frame. Shaft X is intergeared, as at X', (see also Fig. 1) with the cam-shaft in such a manner that the speed of shaft X will be one-half that of the cam-shaft. Upon shaft X is operatively mounted a cam-wheel, $X^2$, that is provided with a peripheral cam-groove, $X^3$, engaged by roller $X^4$, suitably secured to a sliding-plate or block, $X^5$, that is adapted to reciprocate endwise in suitable ways or guides $X^6$ formed on or rigid with the supporting-frame, as shown very clearly in Fig. 6, and lever W' is fulcrumed to said sliding-plate or block, the trend of the groove in cam-wheel $X^2$ being such, and the parts being so arranged and timed that said lever shall at the proper time, after the delivery of the last blow of the hammer and before another open-ended link is brought into position for connection with the chain, be actuated by means of its operative connection with cam-wheel $X^2$, to reciprocate rack W the required distance to give pinion $r^4$ a quarter of a rotation and thereby give the chain-holding-device a quarter turn, bringing the link last welded in the position required for the reception of the next succeeding link. It will also be observed that the chain-holding-device must be swung outwardly to bring the welded link, or link being welded, out of the recess of the die of the anvil in order to permit the turning of the link as hereinbefore described. The chain-holding-device is thus swung outwardly by means of projections or elevations between depressions $e^8$ in the periphery of cam $E^8$, actuating lever S of the mechanism for swinging the chain-holding device outwardly, said projections of cam $e^8$ being located the required interval apart to cause the chain-holding device to be swung outwardly at the proper time, that is, just before the link is turned.

Some of the cams on cam-shaft E may, of course, be integral with each other.

Another important feature to which I would call attention, consists in the manner of supporting the anvil whereby the machine does not receive the shock of the hammer-blows, but the shock, instead, is transmitted to the foundation-timbers of the machine. The construction is very clearly shown in Figs. 7 and 20, wherein Y represents an iron bar or brace to the upper end of which the rear end of the anvil is bolted, as at Y'. At its lower end, brace Y is secured to one of the foundation-timbers, preferably by means of a wedge or key, $Y^2$. Brace Y, at its upper end, is preferably cut away, as at $Y^3$, forming a seat for the rear end of the anvil. The frame-work of the machine is, of course, suitably slotted, to accommodate the location of the anvil. The head of the anvil does not, however, abut the supporting-frame, but sufficient clearance, Z, is provided between the anvil-head and supporting-frame that when the hammer delivers its blows the shock therefrom shall not be transmitted to the supporting-frame but shall be transmitted to brace Y and thence to the foundation-timbers.

What I claim is—

1. In a chain-making machine, in combination a heating-furnace, a carriage adapted to convey the open-ended link from said furnace to and insert the same into the last link added to the chain, a conveyer or carrier for carrying the link-blank to be heated into or through the heating-chamber of the heating-furnace, and suitable means or mechanism for effecting the delivery of the heated link blank from said link-blank conveyer or carrier to the aforesaid link-carriage, substantially as set forth.

2. In a chain-making machine, in combination, a carriage adapted to convey the heated open ended link-blank from the heating-furnace to and insert the same into the last link added to the chain, a carrier or conveyer for feeding the link blank into or through the heating-furnace, a rotating-shaft, a cam or cam-wheel operatively mounted upon said shaft, and suitable means or mechanism for effecting the delivery of the heated link blank from said link-blank carrier or conveyer to the aforesaid link-carriage and adapted to be actuated by the aforesaid cam or cam-wheel, substantially as set forth.

3. In a chain-making machine, in combination, a carriage adapted to convey the heated open-ended link blank from the heating-furnace to and insert the same into the last link added to the chain, a carrier or conveyer for conducting the heated link blanks into or through a heating furnace, suitable means for effecting the delivery of the heated link-blank from said link-blank carrier or conveyer to the aforesaid link-carriage, a rotating shaft and suitable mechanism operatively connecting the link-blank-carrier or conveyer with said shaft for actuating said carrier or conveyer, substantially as set forth.

4. In a chain-making-machine, in combination, a carriage adapted to convey the heated open-ended link-blank from the heating-furnace to and insert the same into the last link added to the chain, a carrier or conveyer for conducting the heated link-blanks into or through a heating furnace, suitable means operatively connected with a shaft for actuating said link-blank carrier or conveyer, suitable means for effecting the delivery of the heated link-blank from the furnace link-blank carrier or conveyer to the aforesaid link-carriage, and a cam or cam-wheel operatively mounted on said shaft for actuating said link-blank delivering means, substantially as set forth.

5. In a chain-making-machine, in combination, a carriage adapted to convey the heated open-ended link-blank from the heating-furnace to and insert the same into the last link added to the chain, a carrier or conveyer for feeding the link-blanks into or through the heating-furnace, a rotating shaft, a cam or cam-wheel operatively mounted upon said shaft, a reciprocating rod or bar terminating at one end in an upright slotted plate or fork for effecting the delivery of the heated link-blank from the link-blank holder or carrier to the aforesaid link-carriage, and suitable means for reciprocating said reciprocating-rod or bar and actuated by the aforesaid cam or cam-wheel, the arrangement of parts being substantially as set forth.

6. In a chain-making-machine, in combination, suitable means for holding the link last added to the chain in position to receive a new link, a track extending lengthwise of the machine forward of said chain-holding means, a carriage mounted on said track adapted to convey the open-ended chain-link from the heating furnace and insert the same into the link last added to the chain, and suitable means for effecting the reciprocation of said carriage, substantially as set forth.

7. In a chain-making-machine, in combination, suitable means for properly holding the last link added to the chain in position for the reception of a new link, a track extending lengthwise of the machine forward of said chain-holding-means, a carriage mounted on said track adapted to convey the heated link-blank from the heating-furnace and insert the same into the last link added to the chain, a rotating shaft, a cam or cam-wheel operatively mounted on said shaft and suitable mechanism operatively connected with said carriage and adapted to be actuated by the cam or cam-wheel, said cam-actuated mechanism being adapted to reciprocate the carriage in the one direction, and one or more springs for reciprocating said carriage in the opposite direction, substantially as set forth.

8. In a chain-making machine, in combination, suitable means for properly holding the last link added to the chain in position for the reception of a new link, a track extending lengthwise and located forward of said chain-holding means, a carriage mounted on said track, chain-holding tongs turnably supported by said carriage, said tongs being adapted to receive an open-ended heated chain-link-blank with the open end presenting downwardly, suitable means for giving the chain-holding tongs a partial turn to bring the link held by the tongs in proper position for insertion into the last link added to the chain, suitable means for engaging the link when held by the tongs and actuating the link to a horizontal position with the open end of the link presented outwardly preparatory to the turning of the tongs, suitable means for closing the jaws of the tongs preparatory to the engagement of the link by said link-actuating means, suitable means for opening the jaws of the tongs after the insertion of the link into the last link added to the chain, and suitable means for reciprocating the link-carriage, substantially as set forth.

9. In a chain-making-machine, in combination, a track extending lengthwise of the machine, a carriage mounted on said track, tongs carried by said carriage, said tongs being adapted to receive an open-ended link-blank with its open end lowermost, and being rotatably supported by the carriage, the shank of the tongs having a laterally-projecting lug or member, a stationary incline located in the path of said laterally-projecting lug or member and adapted to actuate said lug or member and thereby give the link-holding tongs a partial turn, and suitable means for engaging the depending link and actuating the latter to assume a horizontal position with its open end presented outwardly, the arrangement of parts being such that the link shall be caused to assume said horizontal position preparatory to the aforesaid partial turn given to the link-holding tongs, substantially as set forth.

10. In a chain-making-machine, in combination, suitable means for holding the link last added to the chain in proper position to receive a new link, a track located forward of said chain-holding means and extending lengthwise of the machine, a carriage mounted on said track, suitable means for reciprocating said carriage, tongs supported by the carriage, suitable means for opening the tongs and suitable means for closing the tongs, the parts being so arranged and timed that the jaws shall be opened preparatory to the insertion of the open-ended link into the link last added to the chain and shall remain open until it has received another link and shall be closed upon the reception of the link, substantially as set forth.

11. In a chain-making-machine, in combination, suitable means for holding the link last added to the chain in proper position to receive a link for welding, a track located forward of said chain-holding means and extending lengthwise of the machine, a carriage mounted on said track, mechanism for reciprocating said carriage, tongs turnably supported by the carriage and adapted to receive an open-ended heated link with the open end lowermost, suitable means for giving said tongs a partial turn, suitable means for opening the jaws of the tongs upon the insertion of the open-ended heated link into the link last added to the chain, suitable means for actuating the link to a horizontal or approximately horizontal position preparatory to the partial turn given to the tongs, and suitable means for closing the jaws of the tongs preparatory to the actuation of the link into a horizontal position, the arrangement of parts being substantially as set forth.

12. In a chain-making-machine, in combination, suitable means for holding the link last added to the chain in proper position to receive a link for welding, a track located forward of said chain-holding means and extending lengthwise of the machine, a carriage mounted on said track, a rotating shaft, mechanism for moving said carriage and comprising a cam or cam-wheel operatively mounted on said shaft, mechanism operatively connected with said carriage and adapted to be actuated by said cam or cam-wheel to move the carriage in the one direction, and one or more springs for moving said carriage in the opposite direction, tongs turnably supported by the carriage and adapted to receive the open-ended heated link with the open end presenting downwardly, suitable means for giving said tongs a partial turn to bring the link held by the tongs in proper position for insertion into the link last added to the chain, suitable means for opening the jaws of the tongs after said insertion and a cam or cam-wheel operatively mounted on the aforesaid shaft for actuating said tongs-opening means, suitable means for actuating the open-ended link into a horizontal or approximately horizontal position with the open end of the link presented outwardly preparatory to the partial turn given to the tongs, suitable means for closing the jaws of the tongs preparatory to the actuation of the link into a horizontal position, and a cam or cam-wheel operatively mounted on the aforesaid shaft for actuating said tongs-closing means, substantially as set forth.

13. In a chain-making-machine, the combination with the link-carriage for conveying the heated open-ended link to the point at which said link is connected with the chain, said link-carriage being provided with tongs or jaws for holding the link, the latter being received upon the lower jaw with its open end presenting downwardly, of suitable means for actuating said link into a horizontal or approximately horizontal position with the open end of the link presented outwardly, substantially as set forth.

14. In a chain-making-machine, the combination with the link-carriage for conveying the heated open-ended link to the point at which said link is connected with the chain, said link-carriage being provided with tongs or jaws for holding the link, the latter being received upon the lower jaw with its open end presented downwardly, of a stationary upright plate or member located in the path of the link-carriage and adapted to engage and lift the open end of the link into a horizontal or approximately horizontal position, substantially as set forth.

15. In a chain-making-machine, the combination with the carriage for conveying the heated open-ended link to the point at which said link is connected with the chain, said carriage being provided with tongs or jaws for holding the link, the tongs being adapted to receive the link with the open end of the link presented downwardly, of suitable means for actuating said link to bring the open end thereof in proper position for insertion into the link last added to the chain, substantially as set forth.

16. In a chain-making-machine, the combination with a carriage for conveying the heated open ended link to the point at which it is inserted into the link last added to the chain, said carriage being provided with a turnable tongs adapted to hold the open-ended link in a horizontal position, of suitable means for giving said tongs a partial turn to bring the link into the proper position for insertion into the link last added to the chain and suitable means for turning the tongs into its normal position, substantially as set forth.

17. In a chain-making-machine, the combination with a carriage for conveying the heated open-ended link to the point at which it is inserted into the link last added to the chain, said carriage being provided with a turnable tongs adapted to hold the open-ended link in a horizontal position, of a stationary incline for giving said tongs a partial turn to bring the link into the proper position for insertion into the link last added to the chain, and a spring for turning the tongs back into its normal position, substantially as set forth.

18. In a chain-making-machine, the combination with the supporting-frame, a track extending lengthwise of and rigid with said frame, a link-carriage mounted upon and adapted to reciprocate endwise of said track, of a rotating-shaft, a cam operatively mounted on said shaft, an oscillating-shaft located below and arranged at right angles to the aforesaid cam-shaft, a lever fulcrumed upon said oscillating-shaft, an oscillating-lever provided with a roller or projection adapted to be engaged by said cam, a link operatively connecting the cam-actuated lever with the lever of the oscillating shaft aforesaid, a lever and link or connecting rod operatively connecting the link-carriage with said oscillating-shaft, said cam-actuated mechanism being adapted to reciprocate the link-carriage in one direction, and one or more springs for reciprocating said carriage in the opposite direction, substantially as set forth.

19. In a chain-making-machine, the combination with the supporting-frame, a track extending lengthwise of and rigid with said frame, a carriage supported by and movable endwise of said track, said carriage being adapted to convey the heated open-ended link to the point at which it is connected with the link last added to the chain, suitable means or mechanism for reciprocating said carriage, the latter being provided with a sleeve or hollow member, and link-holding tongs, the shank whereof has bearing in and is adapted to be turned within said sleeve or hollow member, suitable means for preventing said tongs from moving endwise of its bearing, the shank of the tongs being provided with a laterally-projecting lug or member, of suitable means for engaging said laterally-projecting lug or member and thereupon actuating the link-holding tongs laterally to bring the link held by the tongs in proper position for insertion into the link last added to the chain, and suitable means for turning said tongs back into its normal position, substantially as set forth.

20. In a chain-making-machine, in combination, suitable means for holding the chain with the link last added to the chain in proper position for the reception of a new link, a track located forward of said chain-holding-means and arranged lengthwise of the machine, a carriage mounted upon and adapted to travel endwise of said track, a link-holding tongs rotatably supported by said carriage, said tongs being adapted to receive the open-ended heated link-blank with the open end of the link presented downwardly, a cam or eccentric interposed between the jaws of said tongs for opening said jaws, suitable means for giving said tongs a partial turn to bring the link-blank in proper position for insertion into the link last added to the chain, suitable means for causing the link-blank to assume a horizontal position with its open end presented outwardly preparatory to said partial rotation of the link-holding tongs, suitable means for actuating the aforesaid cam or eccentric to close the tongs before the link is actuated to a horizontal position, suitable means for actuating said cam or eccentric to open the tongs after the proper insertion of the link into the link last added to the chain, a rotating-shaft, a cam mounted on said shaft, suitable mechanism actuated by said cam and operatively connected with the link-carriage and adapted to reciprocate the carriage in the one direction, suitable means for reciprocating said carriage in the opposite direction, suitable means for rotating the tongs to its normal position preparatory to the reception of another link from the heating-furnace, the cam for actuating the mechanism for reciprocating said carriage away from the heating-furnace being of such construction as to cause said carriage, upon the insertion of the link into the link last added to the chain, to free the link just inserted from the tongs and to permit the open end of the newly added link to drop by gravity into position for the subsequent operations upon the link, substantially as set forth.

21. In a chain-making machine, in combination, a suitable device or means for holding the chain, a reciprocating carriage for conveying the open-ended heated link to and inserting the same into the link last added to the chain, suitable means or mechanism for actuating said carriage, a track for said carriage, reciprocating-bars located rearward of said track and adapted to butt, lap, close or squeeze the free extremities of the open end of the link together, suitable means or mechanism for actuating said bars and suitable means or mechanism for swinging the chain-holding device outwardly into position for the connection of the open-ended link with the chain, and for swinging said device inwardly in position between the squeezing-bars, the arrangement of parts being substantially as and for the purpose set forth.

22. In a chain-making-machine, the combination with a suitable device or means for holding the chain or link last added to the chain, of suitable means or mechanism operatively connected with and adapted to swing said chain-holding-device or means in opposite directions, a rotating-shaft, a cam or cam-wheel operatively mounted on said shaft and adapted to actuate said swinging-means or mechanism in the one direction, and a spring for actuating the same in the opposite direction, substantially as set forth.

23. In a chain-making-machine, the combination with a suitable device or means for holding the chain or link last added to the chain, of a rotating shaft, a cam or cam-wheel operatively mounted on said shaft, lever-mechanism operatively connected with said chain-holding means and adapted to be actuated by said cam or cam-wheel and be thereby swung in the one direction, and a spring for actuating said lever-mechanism to swing said chain or link holding-means in the opposite direction, substantially as set forth.

24. In a chain-making machine, the combination with the supporting-frame, upright housings or standards rigid with said frame, and chain-holding device or means suitably supported between said standards or housings, of an anvil located below said chain-holding device in position to receive the link to be welded, a swinging hammer having two arms pivotally secured to said housings or standards, and adapted to strike the end of the link to be welded, and suitable means or mechanism for actuating said hammer to cause the latter to perform its function, substantially as set forth.

25. In a chain-making machine, the combination with an anvil and suitable means for holding the link last added to the chain against the anvil in position for welding, of a hammer for striking the link upon the anvil, a rotating shaft, a cam or cam-wheel operatively mounted on said shaft, lever-mechanism operatively connected with said hammer and adapted to be actuated by said cam or cam-wheel to swing the hammer in the one direction, and one or more springs for actuating the hammer in the opposite direction, substantially as set forth.

26. In a chain-making machine, the combination with the chain-holding device, a pair of squeezing-bars located a suitable distance rearward of the point at which the open-ended link is connected with the chain, said squeezing-bars being adapted to close the open end of the link, suitable mechanism for reciprocating said bars and suitable mechanism for swinging the chain-holding device from the point at which the link is connected with the chain into position to bring the newly added link between the squeezing-bars, substantially as set forth.

27. In a chain-making machine, the combination with the swinging chain-holding device, a pair of squeezing-bars located a suitable distance rearward of the point at which the open-ended link is connected to the chain, and mechanism for actuating said bars to close the open end of the link, of a rotating cam-shaft, a cam operatively mounted upon the shaft, lever-mechanism operatively connected with the chain-holding device and actuated by said cam to swing the chain-holding device into position to receive the new link, and a spring for actuating said lever-mechanism to swing the chain-holding device from said position into position between the squeezing-bars, substantially as set forth.

28. In a chain-making machine, the combination with the swinging chain-holding device, a pair of squeezing-bars, suitable mechanism for actuating said bars to engage the open-ended link last added to the chain and close the open end of the same, of suitable mechanism for engaging and elevating the chain to bring the newly added link into holding engagement by the chain-holding device after the operation of the aforesaid bars, substantially as set forth.

29. In a chain-making machine, the combination with the swinging chain-holding device, a pair of squeezing-bars, suitable mechanism for actuating said bars to engage the open-ended link last added to the chain and close the open end of the same, of a bar capable of being inserted in one of the links of the chain to bring the newly added link into holding engagement by the chain-holding device after the operation of the aforesaid bars, and suitable mechanism for elevating or lifting the bar upon its insertion, substantially as set forth.

30. In a chain-making machine, the combination with the swinging chain-holding device, a pair of squeezing-bars, suitable mechanism for actuating said bars to engage the open-ended link last added to the chain and close the open end of the same, of a bar $t$ capable of being inserted into one of the links of the chain, a rotating cam-shaft E, a cam $E^8$ operatively connected with the shaft, suitable mechanism operatively connected with the aforesaid bar and adapted to be actuated by said cam to cause the bar to engage the respective link of the chain, a cam $E^9$ operatively mounted upon said shaft and suitable mechanism operatively connected with the aforesaid bar and adapted to be actuated by said cam to elevate or lift the bar, and suitable means for returning said chain-engaging and lifting-mechanism to its normal position, the parts being arranged and timed, substantially as set forth.

31. In a chain-making machine, the combination with the swinging chain-holding device, a pair of squeezing-bars, suitable mechanism for actuating said bars to engage the open-ended link last added to the chain and close the open end of the same, of a bar $t$ capable of being inserted into one of the links of the chain, a rotating cam-shaft E, a cam $E^8$ operatively connected with the shaft, suitable mechanism operatively connected with the aforesaid bar and adapted to be actuated by said cam to cause the bar to engage the respective link of the chain, a cam $E^9$ operatively mounted upon said shaft and suitable mechanism operatively connected with the aforesaid bar and adapted to be actuated by said cam to elevate or lift the bar, and springs for returning said mechanisms to their normal position, substantially as set forth.

32. In a welded-chain-making machine, in combination, the chain-holding device, reciprocating-bars for engaging the open end of the link last added to the chain and closing said end, an anvil located rearward of said squeezing-bars and provided with a female die for receiving the link thus operated upon preparatory to the welding operation, of suitable mechanism for swinging the chain-holding-device to bring the link operated upon from its position between the squeezing-bars into engagement with the female die of the anvil, substantially as set forth.

33. In a welded-chain-making machine, the combination of the supporting-frame, upright standards or housings rigid with said frame, upright chain-holding device pivotally supported by and between said housings or standards, reciprocating-bars T adapted to engage and close the open end of the link last added to the chain and located rearward of the point at which the link is connected with the chain, suitable mechanism for operating said bars, an anvil located rearward of said bars and provided with a female die for receiving said link preparatory to the welding operation, suitable mechanism for engaging and lifting the chain to cause the link to be welded to be firmly held by the chain-holding device, suitable mechanism for swinging the chain-holding device from the point at which the link is connected with the chain into position between the squeezing-bars and from said position to the female-die, a hammer for welding the closed end of the link and suitable mechanism for actuating said hammer, the parts being arranged and timed substantially as and for the purpose set forth.

34. In a welded-chain-making machine, the combination of the supporting-frame having a pair of upright standards or housings $a$, a chain-holding device located between and supported from said standards, an anvil located a suitable distance below said chain-holding-device, and a hammer for co-operating with the anvil in welding the links, said hammer having a pair of upwardly and rearwardly extending arms pivoted to the upper portion of the aforesaid standards or housings, and suitable mechanism for operating the hammer, substantially as set forth.

35. In a welded-chain-making machine, the combination of the supporting-frame having a pair of upright standards or housings $a$, a chain-holding-device located between and supported from said standards, an anvil located a suitable distance below said chain-holding device, and a hammer for co-operating with the anvil in welding the links, the hammer having a pair of upwardly and rearwardly extending arms pivoted to the upper portion of the aforesaid standards or housings, of a rotating cam-shaft, a suitable cam operatively mounted upon said shaft and mechanism operatively connected with the hammer-arms and adapted to be actuated by said cam to elevate the hammer from the anvil, and one or more springs for co-operating with gravity in actuating the hammer to deliver its blows, substantially as set forth.

36. In a welded-chain-making machine, the combination of the supporting-frame having a pair of upright standards or housings, $a$, a chain-holding device suitably supported from the upper end of said housings or standards, an anvil located a suitable distance below the chain-holding-device, a hammer adapted to co-operate with the anvil in welding the links and having upwardly or rearwardly extending arms pivoted to the aforesaid standards or housings, suitable lever-mechanism for elevating or lifting the hammer from the anvil, a rotating shaft and a cam on said shaft for actuating said mechanism, said cam being shaped to cause the hammer to deliver several successive blows, and suitable means co-operating with the gravity of the hammer in actuating the latter to deliver its blows, substantially as set forth.

37. In a welded-chain-making machine, the combination with a chain holding device turnably supported, anvil and hammer for welding the link and mechanism for actuating the hammer to deliver successive blows, of a lever $W^2$, a rotating shaft, a cam on said shaft for operating said lever, a pinion operatively connected with the chain-holding-device and a rack meshing with said pinion and operatively connected with the aforesaid lever, the parts being so arranged and timed that the chain-holding-device is given a one-half turn between successive blows of the hammer, substantially as set forth.

38. In a chain-making machine, the combination with the supporting-frame having a pair of upright standards or housings, $a$, barrel, cylinder or tube, $r$, revolubly supported from and between said housings or standards, said tube, barrel or cylinder, at its lower end, being provided with jaws for holding the link to be welded, the chain being adapted to pass from the machine upwardly through said cylinder, barrel or tube, an anvil or hammer for welding the link last added to the chain, suitable mechanism for actuating said hammer to deliver successive blows and suitable mechanism for giving the barrel, tube or cylinder a one-half turn between successive blows of the hammer, substantially as set forth.

39. In a welded-chain-making machine, a revoluble and laterally-swinging chain-holding-device comprising a revoluble cylinder, barrel or tube pivotally supported so as to be capable of being swung laterally and four spring jaws $a^6$ detachably secured to the lower end of said cylinder, tube or barrel, the newly added link being connected with the chain a suitable distance in front of the point at which the welding operation takes place and the open end of the link being closed at a point between the points at which the connection and welding of the link take place, respectively; suitable means for closing the open end of the link and suitable means for swinging the chain-holding-device laterally to bring the same into the position required relative to the operation to be performed, and suitable mechanism for giving the chain-holding-device a one-half turn to enable the link to be welded to receive blows on opposite sides in the welding operation, the parts being arranged and timed, substantially as set forth.

40. In a welded-chain-making machine, the combination with the chain-holding-device, anvil and hammer for welding the link, suitable mechanism for actuating the hammer to deliver successive blows, and mechanism for giving the chain-holding-device a one-half turn between successive hammer-blows, of suitable mechanism for swinging the chain-holding-device laterally to disengage the link to be welded from the anvil to enable said link to be turned preparatory to the delivery of the next succeeding blow of the hammer, substantially as set forth.

41. In a welded-chain-making-machine, the combination with the chain-holding-device, anvil and hammer for welding the link, mechanism for actuating the hammer to deliver successive blows and mechanism for giving the chain-holding-device a one-half turn between successive hammer-blows, of suitable mechanism for swinging the chain-holding-device laterally to disengage the link to be welded from the anvil to enable said link to be turned preparatory to the delivery of the next succeeding blow of the hammer, and springs acting to retain said chain-holding-device in position with the link to be welded in engagement with the anvil, substantially as set forth.

42. In a welded-chain-making-machine, the combination with the chain-holding-device, anvil and hammer for welding the links, suitable mechanism for actuating the hammer to deliver successive blows and mechanism for giving the chain-holding-device a one-half turn between successive hammer-blows, of lever-mechanism for swinging the chain-holding-device laterally to disengage the link to be welded from the anvil to enable said link to be turned preparatory to the delivery of the next succeeding hammer-blow, a rotating-shaft, a cam operatively connected with said shaft for actuating said lever-mechanism, and suitable means for returning said lever-mechanism to its normal position upon its disengagement by the cam, substantially as set forth.

43. In a welded-chain-making machine, wherein the welding operation is at right angles or approximately at right angles to the position in which the link last added is held for the reception of the next succeeding link-blank, the combination with the chain-holding-device and mechanism for swinging said device laterally into position for the connection of the link-blank, of suitable mechanism for giving the chain-holding-device a quarter-turn or approximately a quarter-turn preparatory to the reception of a new link by the link last welded, substantially as set forth.

44. In a welded-chain-making machine, wherein the welding operation is at right angles or approximately at right angles to the position in which the link last added is held for the reception of the next succeeding link-blank, the combination with the chain-holding-device and mechanism for swinging said device laterally into position for the connection of the link-blank, of suitable mechanism for giving the chain-holding-device a quarter turn or approximately a quarter-turn preparatory to the reception of a new link by the link last welded, a rotating-shaft and cam operatively connected with said shaft for actuating the aforesaid chain-holding-device turning-mechanism, substantially as set forth.

45. In a chain-making-machine, wherein the welding operation is at right angles or approximately at right angles to the position in which the link last added to the chain is held for the reception of the next succeeding link-blank, the combination with the chain-holding-device and mechanism for swinging said device laterally into position for the connection of the link-blank, of suitable means for giving the chain-holding-device a quarter-turn or approximately a quarter-turn preparatory to the connection of the link-blank with the chain, said mechanism comprising a rotating-shaft a cam operatively connected with said shaft, a pinion operatively connected with the chain-holding-device, a rack meshing with said pinion, and mechanism operatively connected with said rack and adapted to be actuated by the aforesaid cam, substantially as set forth.

46. In a welded-chain-making-machine, the combination with the supporting-frame, chain-holding-device, anvil and hammer for welding the links, mechanism for actuating said hammer to deliver successive blows, mechanism for giving the chain-holding-device a one-half turn between successive blows of the hammer, and mechanism for swinging the chain-holding-device laterally between successive hammer-blows to permit the link being welded to be turned as required to present opposite sides alternately for receiving the hammer-blows, the roller-bearing sliding-plate or block, $X^5$, upright roller-bearing lever $W^2$ fulcrumed to said block or plate, gear operatively connected with the chain-holding-device, a rack meshing with said gear and operatively connected with the aforesaid lever, a rotating-shaft E and cam operatively connected with said shaft and engaging the roller of and thereby being adapted to actuate the aforesaid lever to give the chain-holding device a one-half turn, shaft X intergeared with the aforesaid shaft E substantially as indicated, and cam $X^2$ operatively connected with shaft X and engaging the roller of and being thereby adapted to actuate the aforesaid roller-bearing sliding-block or plate, the parts being arranged and timed, substantially as set forth.

In testimony whereof I sign this specification, in the presence of two witnesses, this 29th day of November, 1892.

PHILANDER H. STANDISH.

Witnesses:
C. H. DORER,
WARD HOOVER.